(12) United States Patent
Wang et al.

(10) Patent No.: US 9,551,876 B2
(45) Date of Patent: *Jan. 24, 2017

(54) HEAD UP DISPLAY

(71) Applicant: EMPIRE TECHNOLOGY DEVELOPMENT LLC, Wilmington, DE (US)

(72) Inventors: Yuzhao Wang, Xi'an (CN); Buqing Cheng, Xi'an (CN); Ruikang Sun, Xi'an (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,782

(22) Filed: Dec. 31, 2015

(65) Prior Publication Data

US 2016/0109715 A1   Apr. 21, 2016

Related U.S. Application Data

(63) Continuation of application No. 13/148,724, filed as application No. PCT/CN2010/076398 on Aug. 27, 2010, now Pat. No. 9,268,134.

(51) Int. Cl.
*G02B 27/01* (2006.01)
*G09G 3/00* (2006.01)
(Continued)

(52) U.S. Cl.
CPC .......... *G02B 27/0179* (2013.01); *G02B 27/01* (2013.01); *G02B 27/0101* (2013.01);
(Continued)

(58) Field of Classification Search
None
See application file for complete search history.

(56) References Cited

U.S. PATENT DOCUMENTS 4,790,613 A   12/1988 Moss
4,925,272 A   5/1990 Ohshima et al.
(Continued)

FOREIGN PATENT DOCUMENTS

CN   1967147 A   5/2007
JP   1123730 U   8/1989
(Continued)

OTHER PUBLICATIONS

International Search Report and Written Opinion for PCT International Application No. PCT/CN2010/076398, mailed Jun. 2, 2011.

*Primary Examiner* — Kenneth B Lee, Jr.
(74) *Attorney, Agent, or Firm* — Brundidge & Stanger, P.C.

(57) ABSTRACT

Technologies are generally described for displaying information in a head up display of a vehicle. In one example, an information acquisition unit is configured to obtain data from one or more sensors associated with the vehicle. An information display unit is coupled to the information acquisition unit and the information acquisition unit is further configured to determine a display location based on the data obtained from the one or more sensors. The information acquisition unit is configured to control the information display unit to display information at the determined display location.

23 Claims, 7 Drawing Sheets

(51) Int. Cl.
   *G02B 26/10* (2006.01)
   *G02B 27/14* (2006.01)
(52) U.S. Cl.
   CPC ........... *G09G 3/002* (2013.01); *G02B 26/10* (2013.01); *G02B 27/141* (2013.01); *G02B 2027/014* (2013.01); *G02B 2027/0112* (2013.01); *G02B 2027/0118* (2013.01); *G02B 2027/0183* (2013.01); *G09G 2320/0626* (2013.01); *G09G 2340/0464* (2013.01); *G09G 2340/14* (2013.01); *G09G 2360/144* (2013.01); *G09G 2380/10* (2013.01)

(56) References Cited

U.S. PATENT DOCUMENTS

| | | | |
|---|---|---|---|
| 5,028,912 | A | 7/1991 | Iino |
| 5,638,202 | A | 6/1997 | Rofe |
| 9,268,134 | B2 * | 2/2016 | Wang ............... G02B 27/01 |
| 2005/0084659 | A1 | 4/2005 | Dunkel |
| 2008/0112058 | A1 | 5/2008 | Matsushita et al. |
| 2009/0024357 | A1 | 1/2009 | Aso |
| 2010/0066832 | A1 | 3/2010 | Nagahara et al. |
| 2010/0073636 | A1 | 3/2010 | Sasaki et al. |
| 2011/0016497 | A1 * | 1/2011 | Bloom ............... B60K 35/00 725/75 |
| 2011/0288770 | A1 | 11/2011 | Greasby |

FOREIGN PATENT DOCUMENTS

| | | |
|---|---|---|
| JP | 10100739 A | 4/1998 |
| JP | 2001050771 A | 2/2001 |
| JP | 2003295105 A | 10/2003 |
| JP | 2005193713 A | 7/2005 |
| JP | 2005241288 A | 9/2005 |
| JP | 200730673 A | 2/2007 |
| JP | 20070108326 A | 4/2007 |
| JP | 200830518 A | 2/2008 |
| JP | 2009014692 A | 1/2009 |
| JP | 2010128000 A | 6/2010 |
| KR | 20050010429 A | 1/2005 |
| WO | 0168416 A1 | 9/2001 |
| WO | 2010061272 A1 | 6/2010 |

* cited by examiner

HEAD UP DISPLAY

CROSS-REFERENCE TO RELATED APPLICATIONS

This application is a Continuation under 35 U.S.C. §120 of U.S. patent application Ser. No. 13/148,724, filed on Aug. 10, 2011, now U.S. Pat. No. 9,268,134, which is a U.S. National Stage filing under 35 U.S.C. §371 of PCT Patent Application Ser. No. PCT/CN10/76398, filed on Aug. 27, 2010. The disclosures of both applications are hereby incorporated herein by reference in their entireties.

BACKGROUND

A Head Up Display (HUD) is a display that presents information at a user's typical line of sight so that the user is not distracted from the line of sight, e.g. looking down at a speedometer when driving a vehicle. A conventional HUD typically uses a projector configured to project light onto a display area in a predetermined and fixed manner.

It is recognised that during real time and dynamic applications, a predetermined and fixed display still requires movement from the user's line of sight to obtain information from the HUD. This in turn typically creates distraction to the user and compromises driving safety.

SUMMARY

In an example embodiment, there is provided a head up display device for a vehicle. The device includes an information display unit and an information acquisition unit coupled to the information display unit. The information acquisition unit is configured to obtain data from one or more sensors associated with the vehicle, and is further configured to determine a display location based on the data obtained from the one or more sensors and to control the information display unit to display information at the determined display location.

In some example embodiments, the information acquisition unit includes a microcontroller capable of processing the data to obtain the information for display.

In some example embodiments, the information display unit includes two or more scan mirrors to facilitate displaying the information at the determined display location.

In some example embodiments, the information display unit includes different colour light emitting diodes for providing a desired colour spectrum.

In some example embodiments, the device further includes the one or more sensors.

In some example embodiments, the one or more sensors include an acceleration sensor. The information acquisition unit can be configured to determine the display location based on a comparison of a speed data of the vehicle obtained from the acceleration sensor with a preset threshold speed of the information acquisition unit.

In some example embodiments, the information acquisition unit is configured to determine whether the vehicle is travelling above a speed limit based on a comparison of the speed data of the vehicle with a preset speed limit of the information acquisition unit.

In some example embodiments, the information acquisition unit is configured to control the information display unit to display the information in a different colour from a default colour upon a determination that the vehicle is determined to be travelling above the speed limit.

In some example embodiments, the one or more sensors include a magnetic sensor. The information acquisition unit can be configured to determine a direction of travel information based on travel data of the vehicle obtained from the magnetic sensor.

In some example embodiments, the information acquisition unit is configured to control the information display unit to display the direction of travel information at the determined display location.

In some example embodiments, the one or more sensors include a light sensor. The information acquisition unit can be configured to determine whether the vehicle is travelling during the daytime or during the night time based on light data obtained from the light sensor.

In some example embodiments, the information acquisition unit is configured to control the information display unit to vary a brightness of the information displayed at the determined display location based on the light data.

In an example embodiment, there is provided a method of head up information display in a vehicle. The method includes obtaining data from one or more sensors associated with the vehicle. The method also includes determining a display location based on the data obtained from the one or more sensors. The method further includes displaying the information at the determined display location.

In some example embodiments, the method further includes processing the data to obtain the information for display.

In some example embodiments, the method further includes using two or more scan mirrors to facilitate displaying the information at the determined display location.

In some example embodiments, the method further includes using different colour light emitting diodes to provide a desired colour spectrum for displaying the information.

In some example embodiments, the one or more sensors include an acceleration sensor. The method can include determining the display location based on comparing a speed data of the vehicle obtained from the acceleration sensor against a preset threshold speed.

In some example embodiments, the method further includes determining whether the vehicle is travelling above a speed limit based on comparing the speed data of the vehicle against a preset speed limit.

In some example embodiments, the method further includes displaying the information in a different colour from a default colour upon determining that the vehicle is travelling above the speed limit.

In some example embodiments, the one or more sensors include a magnetic sensor. The method can include determining a direction of travel information based on travel data of the vehicle obtained from the magnetic sensor.

In some example embodiments, the method further includes displaying the direction of travel information at the determined display location.

In some example embodiments, the one or more sensors include a light sensor. The method can include determining whether the vehicle is travelling during the daytime or during the night time based on light data obtained from the light sensor.

In some example embodiments, the method further includes varying a brightness of the information displayed at the determined display location based on the light data.

In an example embodiment, there is provided a computer readable medium storing computer-executable instructions that, if executed, can cause a processor of a head up display device for a vehicle to obtain data from one or more sensors associated with the vehicle. The processor also determines a display location based on the data obtained from the one or more sensors. Further, the processor displays the information at the determined display location.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
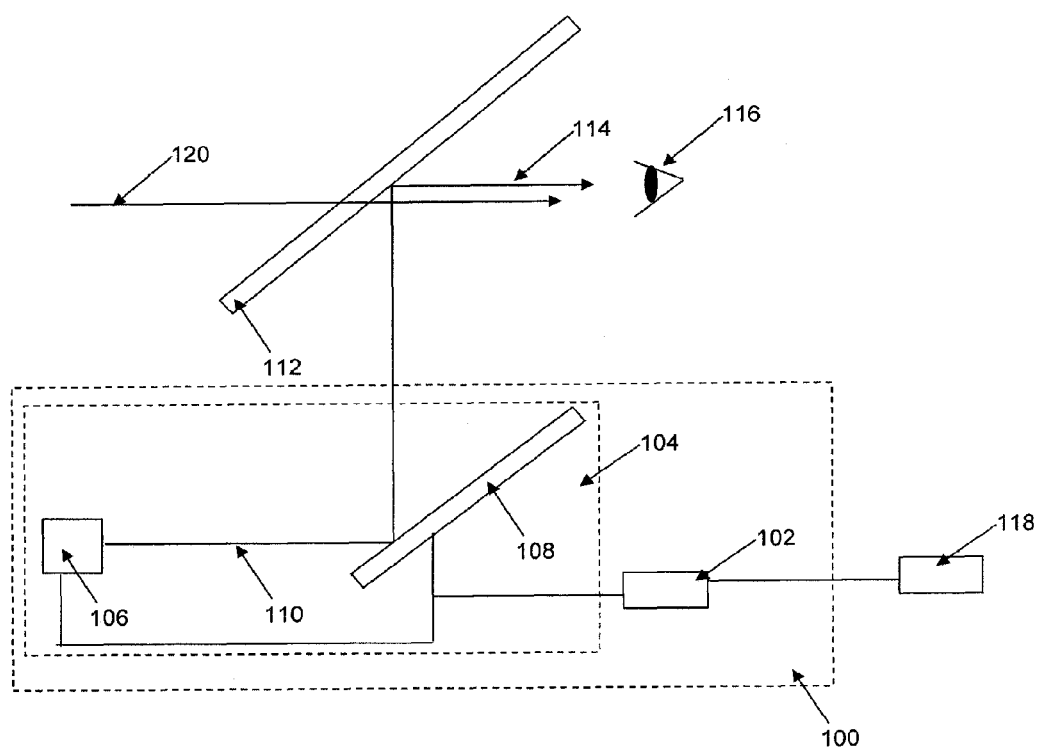
FIG. 1 is a schematic diagram illustrating a Head Up Display device in an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In an illustrative embodiment, any of the operations, processes, etc. described herein can be implemented as computer-readable instructions stored on a computer-readable medium. The computer-readable instructions can be executed by a processor of a vehicle, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In an example embodiment, a Head Up Display (HUD) device is provided for displaying information at a variable position on a display area. The position for displaying the information may be determined from data obtained from one or more sensors. For example, if the HUD device is used in a vehicle and the vehicle is sensed to be moving above a threshold speed, the position for displaying the information may be adjusted to a higher level with respect to a dashboard of the vehicle. This can minimize adjustment of a user's, such as, by way of example, a vehicle operator's, line of sight during real time and dynamic applications.

FIG. 1 is a schematic diagram illustrating a HUD device 100 in an example embodiment. In the example embodiment, the HUD device 100 includes an information acquisition unit 102 and an image display control unit 104. The image display control unit 104 includes a light source 106 and a movable reflective element 108. The light source 106 is provided to output a light beam 110. The HUD device 100 is configured to project the light beam 110 onto a vehicle windscreen 112 to show display information 114. A user eye is shown schematically at 116. The information acquisition unit 102 is coupled to one or more sensors e.g. 118.

In the example embodiment, in use, the information acquisition unit 102 acquires data sensed by the one or more sensors e.g. 118 and processes the acquired data into information e.g. pre-set symbols based on a chosen mode. The information acquisition unit 102 then outputs the processed information in terms of, but not limited to, image or text to the image display control unit 104. In addition, the information acquisition unit 102 also provides display control signals based on the data to the image display control unit 104. The image display control unit 104 receives the processed information and projects the processed information onto the windscreen 112 to show the display information 114. In addition, the image display control unit 104 receives the display control signals from the information acquisition unit 102 to adjust a position of the display information 114 on the windscreen 112 so that the user eye 116 need not be adjusted or significantly adjusted from its initial line of sight 120. The adjustment of the position can be effected by controlling the movable reflective element 108 of the image display control unit 104. Therefore, with a variable position of the display information 114, the line of sight 120 may be advantageously focused on receiving surrounding information beyond the windscreen 112 while still being able to view the display information 114.

In the example embodiment, the HUD device 100 uses, but is not limited to, two 1D scan devices in the movable reflective element 108 to independently control the 2D direction of the reflection of the light beam 110. This can allow control of the column and row scans of the display information 114 on the windscreen 112.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2A:
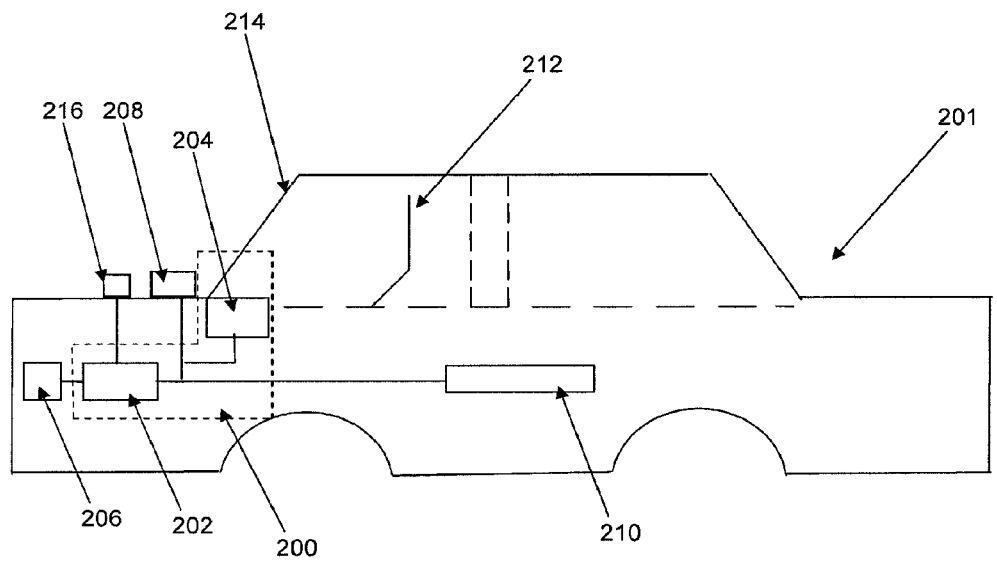
FIG. 2(a) is a schematic diagram of a Head Up Display device installed in a vehicle in an example embodiment.
Figure 2B:
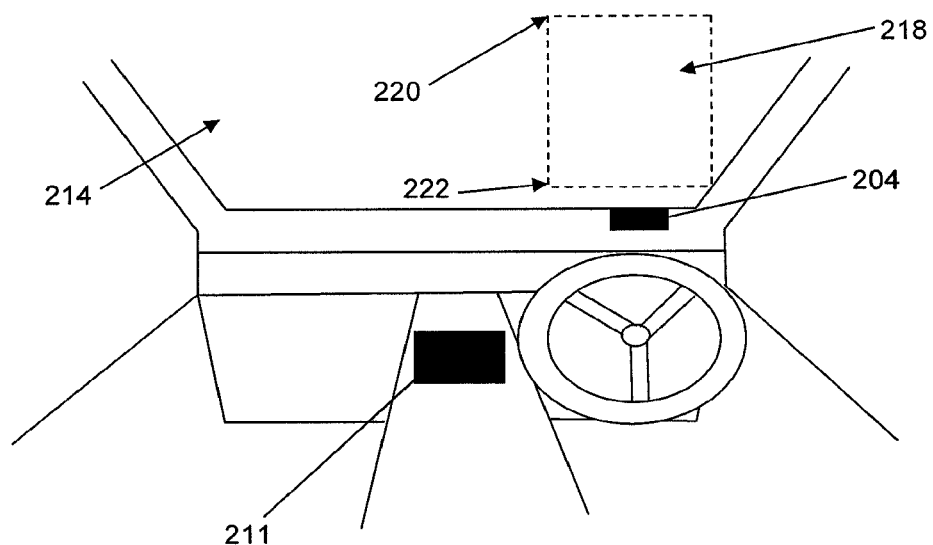
FIG. 2(b) is a schematic diagram of the vehicle interior in the example embodiment.

FIG. 2(a) is a schematic diagram of a HUD device 200 installed in a vehicle in an example embodiment. FIG. 2(b) is a schematic diagram of the vehicle interior in the example embodiment.

In the example embodiment, the HUD device 200 is provided in a vehicle 201. The HUD device 200 includes a microcontroller unit (MCU) 202 implementing an information acquisition unit and a display unit 204. The display unit 204 functions substantially similar to the image display control unit 104 of FIG. 1. The MCU 202 is disposed in a suitable docking bay in the vehicle 201. The MCU 202 is coupled to the display unit 204. The MCU 202 is also coupled to one or more sensors such as a magnetic sensor 206, a temperature sensor 208, an accelerometer 210 and a light sensor 216. In addition, the MCU 202 is coupled to a control panel 211 installed in the vehicle interior for receiving user input. The display unit 204 may be installed inside the vehicle between a driver seat (shown schematically at 212) and a windshield 214. The display unit 204 is configured to receive information from the MCU 202 for projection of the information onto the windshield 214. The display unit 204 is also configured to receive control signals from the MCU 202 to adjust a position of the information projected onto the windshield 214. The display unit 204 is further configured to receive control signals from the MCU 202 to control the characteristics, such as but not limited to, brightness, of the information being projected. A display area 218 on the windshield 214 for the HUD device 200 is shown in FIG. 2(b). In the example embodiment, the display area 218 can be additionally coated with a layer of reflective material to enhance reflection of the information to the user.

In the example embodiment, the control panel 211 can allow a user to choose the mode and/or format of information for display. For example, the user can choose to display a current speed of the vehicle 201 on the display area 218. The speed can be displayed in the form of digits or colour bars. The control panel 211 can also allow a user to input a preset speed limit such that the HUD device 200 can output (e.g., generate) an alarm in an event that the preset speed limit is exceeded. The control panel 211 also allows the user to reset, calibrate or program a preset threshold speed for use in determining a position of the information on the display area 218.

In the example embodiment, the position of the information projected onto the display area 218 can vary between the two ends 220, 222 of the display area 218 depending on the speed of the vehicle 201, upon control by the display unit 204. As an example, a preset threshold speed can be pre-stored in the MCU 202. If the speed of the vehicle 201 exceeds the preset threshold speed, the position of the information projected onto the display area 218 is adjusted upwards towards the end 220. If the speed of the vehicle 201 is below the preset threshold speed, the position of the information projected onto the display area 218 is adjusted upwards towards the end 222. If the speed of the vehicle 201 stays within the preset threshold speed, the position of the information projected onto the display area 218 is maintained substantially in the middle of the display area 218.

The range of movement of the position of the information from the middle of the display area 218 is calibrated to speed deviations from the preset threshold speed. For example, given a preset threshold speed of about 50 km/h, the MCU 202 can be configured to instruct the display unit 204 to adjust the position of the information projected onto the display area 218 by about 2 cm from the middle of the display area 218 for every step-size of 5 km/h from the preset threshold speed. As described, the control panel 211 allows the user to reset, calibrate or program the preset threshold speed. It will be appreciated that as an alternative, rather than use a singular speed, a preset threshold speed range may be used instead.

Thus, in the example embodiment, the MCU 202 can control three functions. The MCU 202 can control reception of sensor signals/data from e.g. the magnetic sensor 206, the temperature sensor 208, the accelerometer 210 and the light sensor 216. The MCU 202 can obtain a speed of the vehicle 201 for controlling the display unit 204 to determine a position for information display on the display area 218. The MCU 202 can also control light intensity and RGB colours of the display unit 204 to provide a desired information display.

In the example embodiment, the MCU 202 can acquire operational information of the vehicle 201, such as vehicle acceleration (using data from the accelerometer 210), ambient temperature (using data from the temperature sensor 208) and direction of movement (using data from the magnetic sensor 206). The MCU 202 can process the sensor signals/data to obtain information, for example, integrating accelerometer signals to obtain a speed of the vehicle 201. As an alternative, the MCU 202 can obtain a speed of the vehicle 201 from a speedometer of the vehicle 201. Processed information such as temperature or speed can be displayed via the display unit 204 onto the display area 218 for the driver's viewing. The MCU 202 also controls the display unit 204 to display the information at a variable display location on the display area 218. The display location is determined based on, but not limited to, the speed of the vehicle 201.

To control the display unit 204, the MCU 202 generates mirror-plane angle control signals based on the speed of the vehicle 201 for use by the display unit 204. These control signals can be used to adjust a display position of the information on the display area 218. Further, the MCU 202 can also generate control signals for image display based on light intensity. For example, the MCU 202 can control display images and brightness of the display information based on the sensed external light intensity from the light sensor 216. Thus, the display can be self-adaptive to the environment. For example, character and image brightness can be increased during the day and decreased at night, keeping to a contrast ratio of about 200:1 so that the driver can see the display clearly without experiencing glare.

In the described example embodiment, the speed of the vehicle 201 is used as a reference point for the image display position. It is recognized that at a higher speed, a driver tends to focus sight at distant objects. Therefore, at higher speeds above a preset threshold speed, the MCU 202 is configured to display information at a higher position on the windshield 214 with respect to the dashboard. At slower speeds, it is recognized that a driver tends to focus on traffic nearby. Therefore, at slower speeds below a preset threshold speed, the MCU 202 is configured to display information at a lower position on the windshield 214 with respect to the dashboard. This can ensure that the display information is within the driver's line of sight, thus preventing driver distraction due to a misplaced display and leading to improved safety.

Figure 3A:
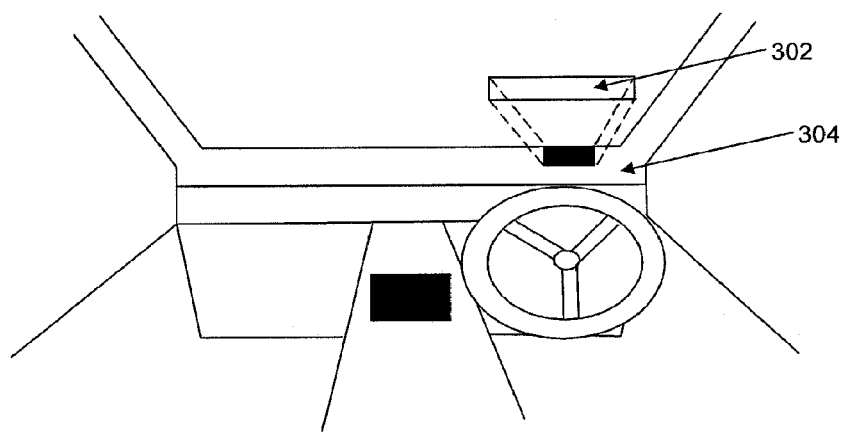
FIG. 3(a) is a schematic diagram illustrating a Head Up Display device display at a speed of about 80 km/h in an example embodiment.
Figure 3B:
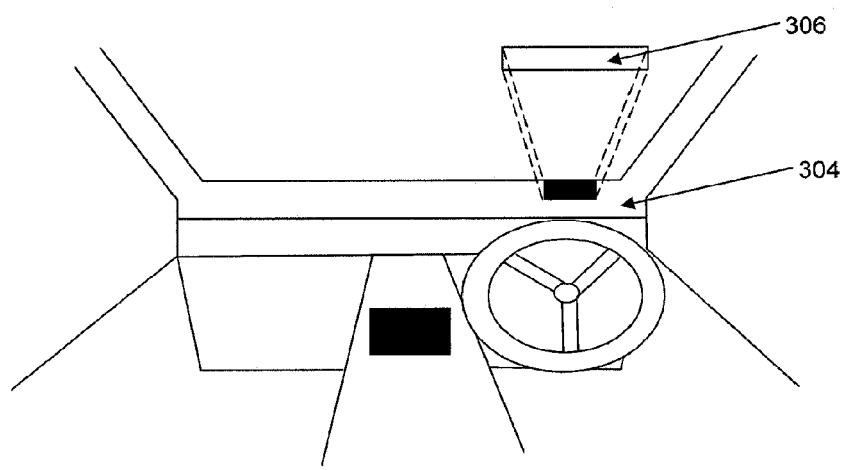
FIG. 3(b) is a schematic diagram illustrating a Head Up Display device display at a speed of about 180 km/h in an example embodiment.

FIG. 3(a) is a schematic diagram illustrating a HUD device display at a speed of about 80 km/h in an example embodiment. FIG. 3(b) is a schematic diagram illustrating a HUD device display at a speed of about 180 km/h in an example embodiment. A display location 302 is relatively lower with respect to the dashboard 304 at 80 km/h (as depicted in FIG. 3(a)) as compared to a display location 306 at 180 km/h (as depicted in FIG. 3(b)).

Figure 4:
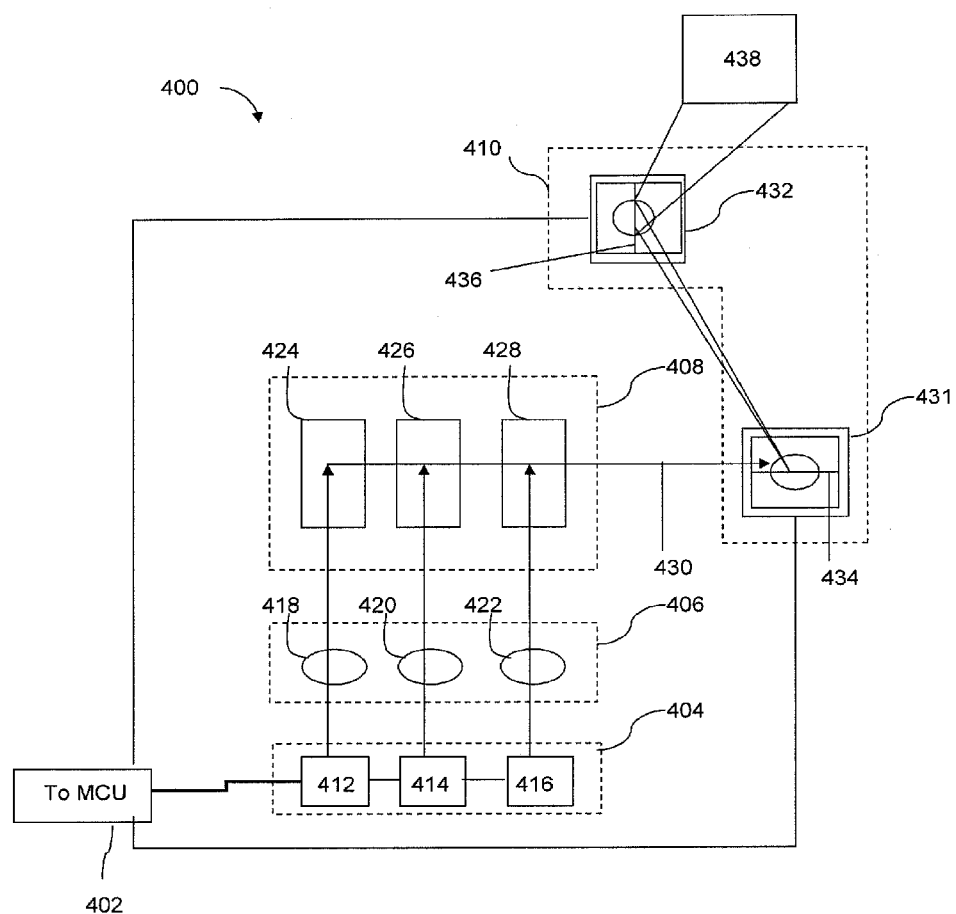
FIG. 4 is a schematic diagram illustrating an image display control unit in an example embodiment.

FIG. 4 is a schematic diagram illustrating an image display control unit 400 in an example embodiment. The image display control unit 400 functions substantially similar to the display unit 204 of FIG. 2. In the example embodiment, the image display control unit 400 functions as a laser projector. The image display control unit 400 includes a MCU connection 402 coupled to a laser/light emitting diode array 404, a collimator lens array 406, a dichroic prism array 408 and a scan device 410. The light emitting diode array 404 can include a red light emitting diode (LED) 412, a green LED 414 and a blue LED 416. The MCU connection 402 facilitates connection to a MCU substantially similar to the MCU 202 of FIG. 2.

In the example embodiment, the collimator lens array 406 includes collimator lens 418, 420, 422, each corresponding to a LED in the diode array 404 for focusing and directing the diode light from the respective LED 412, 414 or 416 into a respective laser light beam. The dichroic prism array 408 includes dichroic prisms 424, 426, 428 each corresponding to a collimator lens in the collimator lens array 406. The dichroic prisms 424, 426, 428 collect the laser light beams from the respective collimator lens 418, 420, 422 and mix the light to obtain a desired color spectrum laser beam 430.

In the example embodiment, the MCU connection 402 is also coupled to the scan device 410. The scan device 410 is in the form of a micro electro mechanical system that includes two resonant mirrors 431, 432, each for 1D scan purposes. The mirror 431 oscillates along a substantially horizontal axis 434 while the mirror 432 oscillates along a substantially vertical axis 436. The mirrors 431, 432 can be adjusted/tilted along the respective substantially horizontal axis 434 and substantially vertical axis 436 based on mirror-plane angle control signals received from a MCU (not shown).

In the example embodiment, the MCU connection 402 receives control signals from a MCU (not shown) to control the output power of the red laser generator 412, the green laser generator 414, and the blue laser generator 416 to obtain a desired color spectrum. The MCU connection 402 also receives mirror-plane angle control signals from the MCU (not shown) for controlling adjustment/tilting of the mirrors 431, 432, for example, based on a speed of a vehicle. Therefore, the desired color spectrum laser beam 430 can be controlled in a 2D direction along the two axes 434, 436 to determine a desired position to display a projected image/text 438.

In use, the mirrors 431, 432 are driven with raster scanning, i.e. resonant driving in the horizontal direction along the axis 434 and nonresonant driving in the vertical direction along the axis 436. The light emitting diode array 404 and the scan device 410 are controlled by a MCU such that the laser beam 430 is modulated at high frequency and outputs an image/text signal at one pixel at a time to form the projected image/text 438. The mirror 431 gives the laser beam 430 a horizontal refresh modulation and the laser beam 430 is reflected onto the mirror 432 which provides the vertical refresh. The image/text commands are based on image processing conducted by the MCU, for example, generation of an image of a current speed of a vehicle. The MCU also controls the mirror angles of the mirrors 431, 432 along the respective axes 434, 436 to display the projected image/text 438 at a desired position.

For example, in a vehicle, mirror-plane angle control signals can be output to adjust/tilt the mirrors 431, 432 for displaying the image/text 438 at a higher position relative to a dashboard of a vehicle when the MCU determines that the vehicle is travelling at a high speed as compared to a preset threshold speed.

It will be appreciated that as an alternative to using two resonant mirrors, the image display control unit can be modified to optically spread and then modulate the laser beam. The laser beam is then used for scanning the image/text a line at a time, the line itself being modulated using a technique similar to digital light processing techniques. It will also be appreciated that although a laser projector has been described, other display systems may be also used, for example, liquid crystal display projectors etc.

Figure 5:
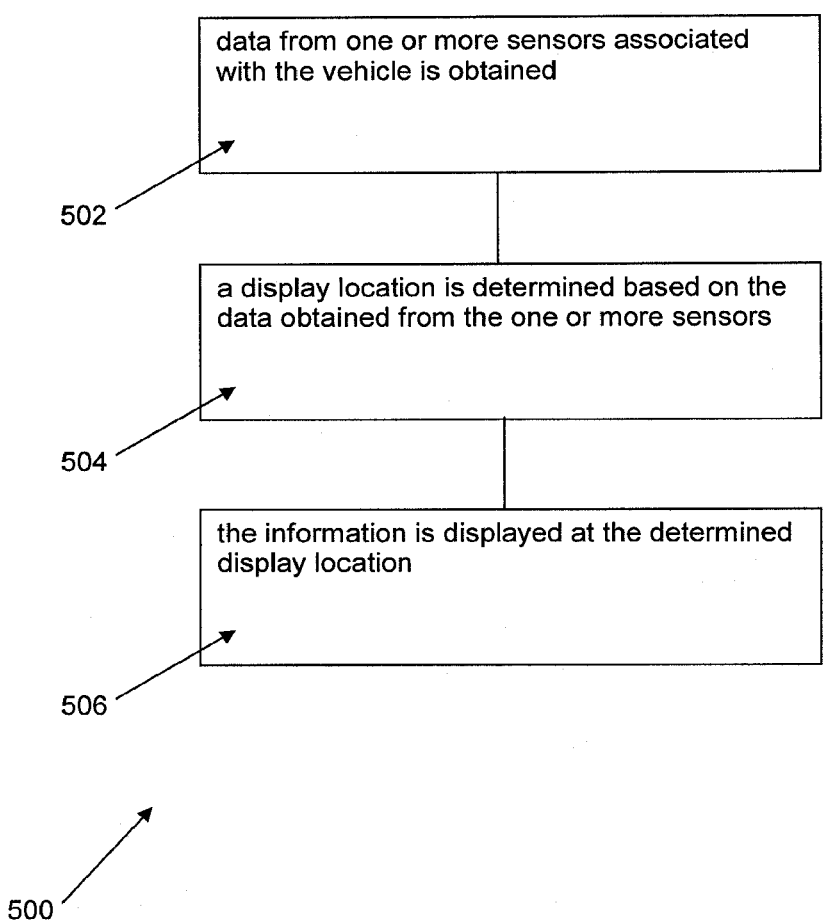
FIG. 5 is a schematic flowchart illustrating a method for head up information display in a vehicle in an example embodiment.

FIG. 5 is a schematic flowchart illustrating a method 500 for head up information display in a vehicle in an example embodiment. The method in FIG. 5 could be implemented using, for example, the HUD device 100 discussed above. An example method may include one or more operations, actions, or functions as illustrated by one or more of blocks 502, 504 and/or 506. Although illustrated as discrete blocks, various blocks may be divided into additional blocks, combined into fewer blocks, or eliminated, depending on the desired implementation. Processing may begin at block 502.

At block 502, data from one or more sensors associated with the vehicle is obtained. Processing may continue from block 502 to block 504.

At block 504, a display location is determined based on the data obtained from the one or more sensors. Processing may continue from block 502 to block 504.

At block 506, the information is displayed at the determined display location.

In relation to the above example embodiments, it will be appreciated that different sensors can provide different information.

An acceleration sensor or accelerometer can be in the form of a dual-axis acceleration sensor. The acceleration sensor can be configured to collect the magnitude and the direction of the acceleration of a vehicle in two axes, each of the axes being perpendicular to the other. A MCU may be configured to receive the acceleration information from the acceleration sensor and time information from a clock to plot a chart capturing the acceleration of a vehicle over a certain period of time (also referred to as an acceleration vs. time chart). Integration may be performed by the MCU by calculating the integral of the acceleration function from a first time point to a second time point based on the acceleration vs. time chart to obtain velocity information. The velocity may be used for various purposes, such as being compared to a preset speed limit to detect speeding or compared to a preset threshold speed for determining a display location of a HUD device.

A magnetic sensor can be configured to collect directional information (e.g., north, east, north-east, etc.) of a moving vehicle based on interaction between a magnet in the magnetic sensor and the earth's magnetic field. In some embodiments, the magnetic sensor may correspond to a known vector magnetometer, which is generally used to measure the component of the magnetic field in a particular direction, relative to its spatial orientation. The magnetic sensor may be arranged on a vehicle to be integrated with a dual-axis acceleration sensor so that increasing positive values on an X-axis in a multi-dimensional plane corresponds to the forward movement of the vehicle. With such an example correlation as a reference, as the vehicle moves in different directions, the magnetic sensor generates different values on different axes in the multi-dimensional plane, and such values can be further mapped to the direction that the vehicle is moving towards giving vehicle heading information. In some example embodiments, the magnetic sensor may be placed parallel to a plane defining a bottom of a vehicle for enhanced accuracy.

A light sensor can be configured to collect the illuminance of the environment surrounding the vehicle (hereinafter "illuminance information"). A MCU may receive illuminance information from the light sensor and compare the collected illuminance information against a predetermined value to determine whether it is currently daytime or nighttime. If it is daytime, the MCU may issue a control command causing the HUD device display brightness to increase for better visibility. On the other hand, if it is nighttime, the MCU may issue a control command causing the display brightness to decrease.

A global positioning system (GPS) unit can also be included as a sensor for collecting and processing location data. A MCU may receive the location data and can be configured to display the location data for e.g. providing driving directions etc.

In relation to the above example embodiments, it will be appreciated that a HUD device can be configured to output or generate an alarm in an event if a preset speed limit of a vehicle is exceeded during travel. For example, information displayed by the HUD device can be in a default colour, for example, blue colour if the speed limit is not exceeded. If a MCU determines that the preset speed limit has been exceeded, the information displayed can change from the default colour into a warning colour, for example, red colour. In addition, the MCU can be configured to sound an audio alarm via a speaker of the vehicle.

The HUD device can also be configured to be connectable to the internet such that information from the internet can be displayed for user viewing.

Figure 6:
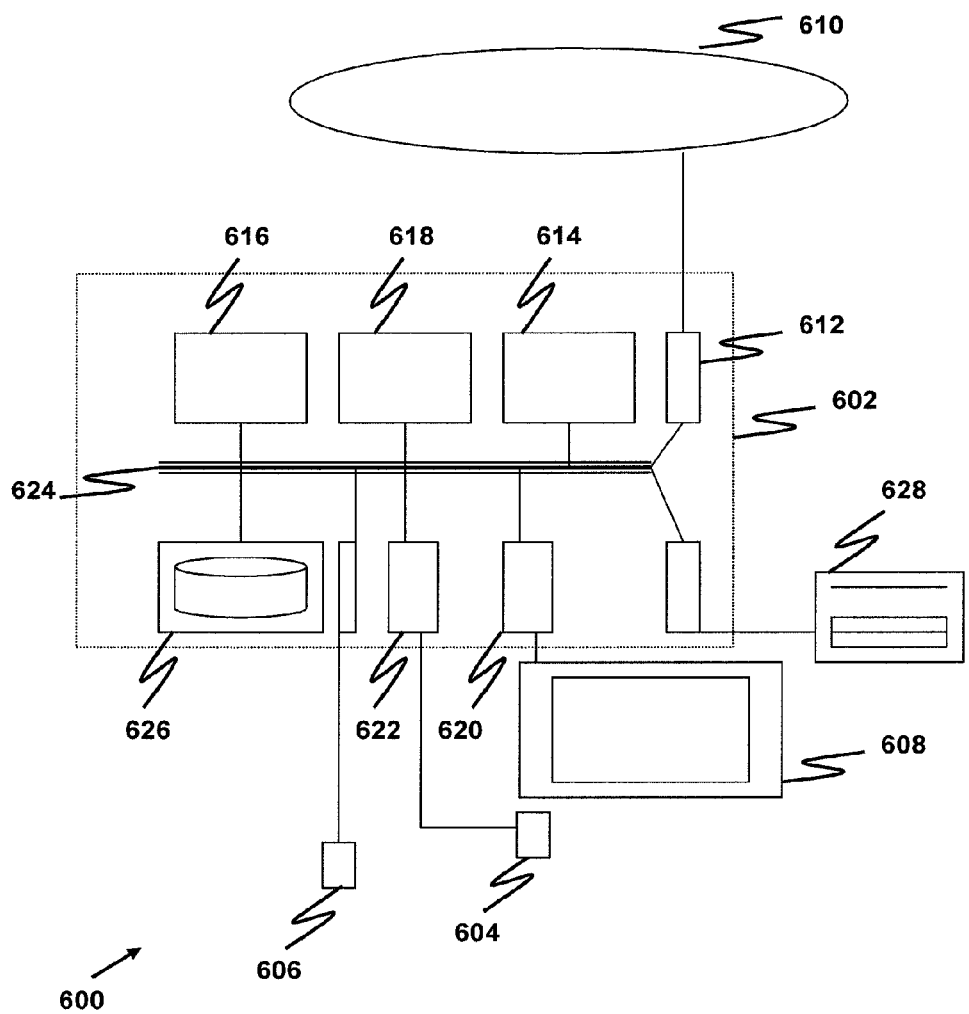
FIG. 6 is a schematic illustration of a controller unit for implementing a method for head up information display in a vehicle in an example embodiment.

FIG. 6 is a schematic illustration of a controller unit 600 for implementing a method of head up information display in a vehicle in an example embodiment. The example embodiments described herein can be implemented using the controller unit 600. By way of example, the technologies of the example embodiments described herein may be implemented as software, such as a computer program being executed within the controller unit 600, configured or programmed to the controller unit 600 to conduct the methods of the example embodiments described herein.

As depicted, the controller unit 600 includes a computer module 602 (compare information acquisition unit 102 of FIG. 1), sensor modules such as an acceleration sensor 604 and a magnetic sensor 606, and a display unit 608. The controller unit 600 can also include a global positioning system unit 628.

The computer module 602 is coupled to a computer network 610 via a suitable transceiver device 612, to enable access to e.g. the Internet or other network systems such as Local Area Network (LAN) or Wide Area Network (WAN).

The computer module 602 in the example includes a processor 614, a Random Access Memory (RAM) 616 and a Read Only Memory (ROM) 618. The computer module 602 also includes a number of Input/Output (I/O) interfaces, for example I/O interface 620 to the display unit 608, and I/O interface 622 to the acceleration sensor 604.

The components of the computer module 602 typically communicate via an interconnected bus 624 and in a manner known to a person skilled in the relevant art.

An application program is supplied to the controller unit 600 encoded on a data storage medium such as a flash memory carrier and read utilizing a corresponding data storage medium drive such as a universal serial bus (USB) interface port of a data storage device 626. The application program is read and controlled in its execution by the processor 614. Intermediate storage of program data may be accomplished using RAM 616.

In the above described example embodiments, a micromirror virtual imaging is used for a HUD device for showing traffic information or road conditions can be provided. This can enable a vehicle operator to operate a vehicle without having to adjust line of sight to look at the dashboard or instrument panel. The HUD device can also adjust the position of a projected image according to vehicle speed to achieve better safety. The HUD device can also adjust back light, image brightness and characters according to environment and according to acceptable brightness to the human eye. Furthermore, it is possible to equip the HUD device with an alarm device so that when the vehicle exceeds a pre-set speed, the HUD device can issue a warning.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It will be appreciated that the display location is not limited to being adjusted up or down with respect to a dashboard of a vehicle. The display location can also be configured to be adjustable between left and right positions, for example, if it is determined that the vehicle is turning and the user may be looking in the direction of the turn.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A head up display device for a vehicle, comprising:
an information display unit;
a light sensor; and
an information acquisition unit coupled to the information display unit and to the light sensor, the information acquisition unit configured to:
obtain light data from the light sensor,
obtain acceleration and speed data of the vehicle,
determine a horizontal display location based on a comparison of the acceleration and speed data of the vehicle with a preset threshold speed associated with a specific display location,
control the information display unit to display information at the specific display location, and
vary brightness of the displayed information at the specific display location based on the obtained light data.

2. The device of claim 1, wherein the information acquisition unit comprises a microcontroller capable to process data to obtain the displayed information.

3. The device of claim 1, wherein the information display unit comprises two or more scan mirrors to facilitate display of the information at the specific display location.

4. The device of claim 1, wherein the information display unit comprises different color light emitting diodes to provide a specific color spectrum.

5. The device of claim 1, wherein the information acquisition unit is further configured to determine whether a current speed of the vehicle is above a speed limit based on the acceleration and speed data of the vehicle.

6. The device of claim 5, wherein the information acquisition unit is further configured to control the information display unit to display the information in a different color from a default color upon a determination that the current speed of the vehicle is above the speed limit.

7. The device of claim 1, wherein the information acquisition unit is further configured to:
obtain data from a magnetic sensor, and
determine a direction of travel information based on travel data of the vehicle obtained from the magnetic sensor.

8. The device of claim 7, wherein the information acquisition unit is further configured to control the information display unit to display the direction of travel information at the specific display location.

9. The device of claim 1, wherein the information acquisition unit is further configured to determine whether the vehicle is travelling during the daytime or during the night time based on the obtained light data.

10. The device of claim 1, wherein:
the information acquisition unit is configured to adjust the specific display location upward in response to a current speed of the vehicle being greater than the preset threshold speed, and
the information acquisition unit is configured to adjust the specific display location downward in response to the current speed of the vehicle being less than the preset threshold speed.

11. A method to display head up information in a vehicle, comprising:
obtaining a current speed of the vehicle;
comparing the current speed of the vehicle with a preset threshold speed to determine a display location of the head up information;
displaying the head up information at the display location;
obtaining light data from a light sensor; and
varying brightness of the head up information displayed at the display location based on the obtained light data.

12. The method of claim 11, wherein the displaying comprises using two or more scan mirrors to facilitate displaying the head up information at the display location.

13. The method of claim 11, wherein the displaying comprises using different color light emitting diodes to provide a specific color spectrum to display the head up information.

14. The method of claim 11, further comprising determining whether the vehicle is travelling above a speed limit based on comparing the current speed of the vehicle against a preset speed limit.

15. The method of claim 14, further comprising displaying the head up information in a different color from a default color in response to determining that the vehicle is travelling above the speed limit.

16. The method of claim 11, wherein:
in response to the current speed of the vehicle being greater than the preset threshold speed, adjusting upward a current display location of the head up information, and
in response to the current speed of the vehicle being less than the preset threshold speed, adjusting downward the current display location of the head up information.

17. The method of claim 11, further comprising:
obtaining travel data from a magnetic sensor; and
determining a direction of travel information based on the travel data of the vehicle obtained from the magnetic sensor.

18. The method claim 17, further comprising displaying the direction of travel information at the display location.

19. The method of claim 11, further comprising determining whether the vehicle is travelling during daytime or during night time based on the obtained light data.

20. A non-transitory computer readable medium having stored thereon computer-executable instructions that, in response to being executed, cause a processor of a head up display device for a vehicle to perform or control performance of:
obtain acceleration and time data from at least an acceleration sensor and initial speed data of the vehicle;
determine a current speed of the vehicle based on the initial speed data and integration of the acceleration data over time data;
determine a horizontal display location based on a comparison of the current speed of the vehicle with a preset threshold speed associated with a specific display location;
display head up information at the determined horizontal display location;
obtaining light data from a light sensor; and
varying brightness of the head up information displayed at the determined horizontal display location based on the light data.

21. The non-transitory computer readable medium according to claim 20, wherein the computer-executable instructions, in response to being executed, further cause the processor to perform or control performance of:
obtain magnetic data from a magnetic sensor to determine a direction of travel information.

22. The non-transitory computer readable medium according to claim 20, wherein the computer-executable instructions, in response to being executed, cause the processor to perform or control performance of:
determine whether the vehicle is travelling during day time or night time.

23. A head up display device for a vehicle, comprising:
an information display unit;
a light sensor; and
an information acquisition unit coupled to the information display unit and to the light sensor, the information acquisition unit configured to:
obtain light data from the light sensor,
obtain velocity data of the vehicle,
determine a horizontal display location based on a comparison of the velocity data of the vehicle with a preset threshold velocity associated with a specific display location,
control the information display unit to display information at the determined horizontal display location, and
vary brightness of the information displayed at the specific display location based on the obtained light data.

* * * * *

UNITED STATES PATENT AND TRADEMARK OFFICE
CERTIFICATE OF CORRECTION

Page 1 of 1

PATENT NO. : 9,551,876 B2
APPLICATION NO. : 14/985782
DATED : January 24, 2017
INVENTOR(S) : Wang et al.

It is certified that error appears in the above-identified patent and that said Letters Patent is hereby corrected as shown below:

In the Specification

In Column 1, Line 6, delete "§120" and insert -- § 120 --, therefor.

In Column 1, Line 9, delete "§371" and insert -- § 371 --, therefor.

In Column 12, Line 1, delete "phrases at least one and one or more to" and insert -- phrases "at least one" and "one or more" to --, therefor.

In Column 12, Line 4, delete "or an limits" and insert -- or "an" limits --, therefor.

In Column 12, Lines 7-8, delete "phrases one or more or at least one and" and insert -- phrases "one or more" or "at least one" and --, therefor.

In Column 12, Line 9, delete "an (e.g.," and insert -- "an" (e.g., --, therefor.

Signed and Sealed this
Second Day of May, 2017

Michelle K. Lee
*Director of the United States Patent and Trademark Office*